Figure 1:
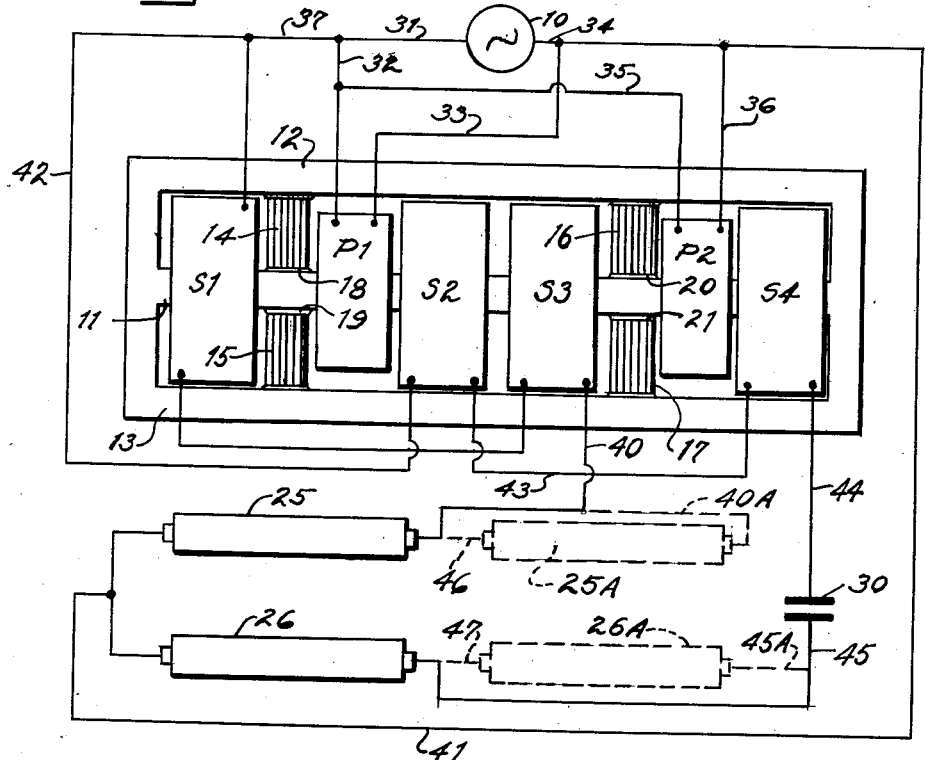

Aug. 11, 1953  C. R. KAZEBEE  2,648,802
SYSTEM AND APPARATUS FOR GASEOUS TUBES
Filed Jan. 10, 1949  3 Sheets-Sheet 1

INVENTOR.
Charles R. Kazebee
BY
Bates, Teare & McBean

Aug. 11, 1953     C. R. KAZEBEE     2,648,802
SYSTEM AND APPARATUS FOR GASEOUS TUBES
Filed Jan. 10, 1949     3 Sheets-Sheet 2
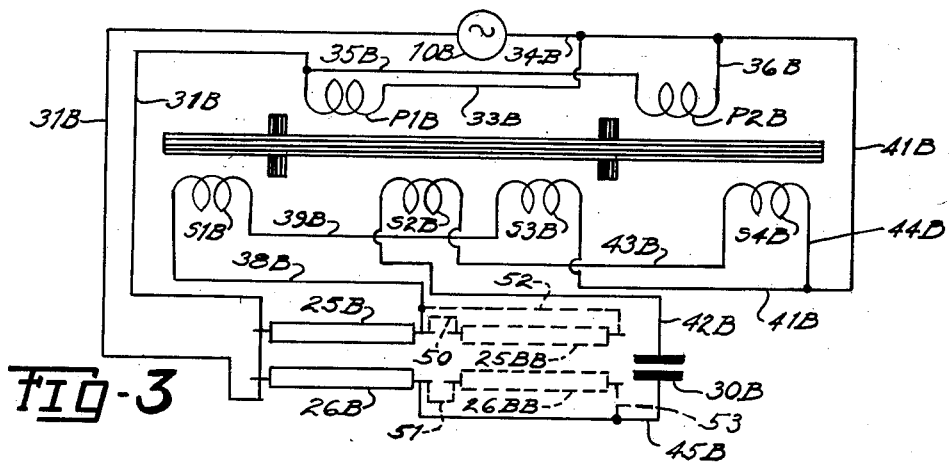
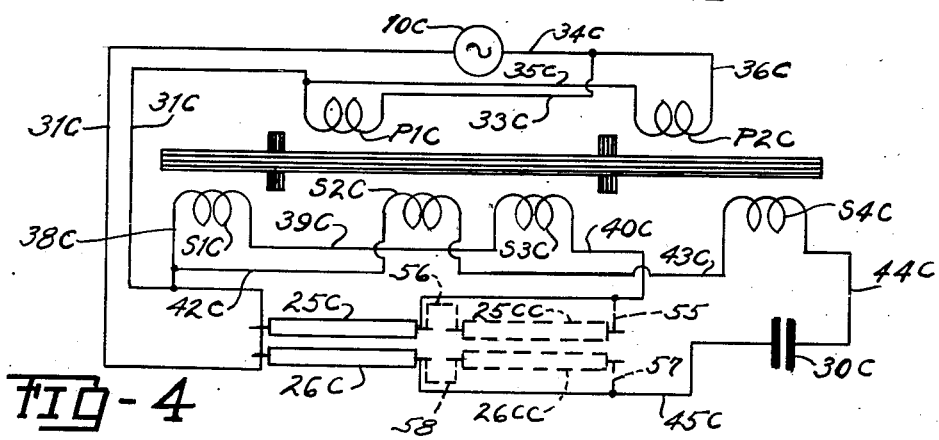
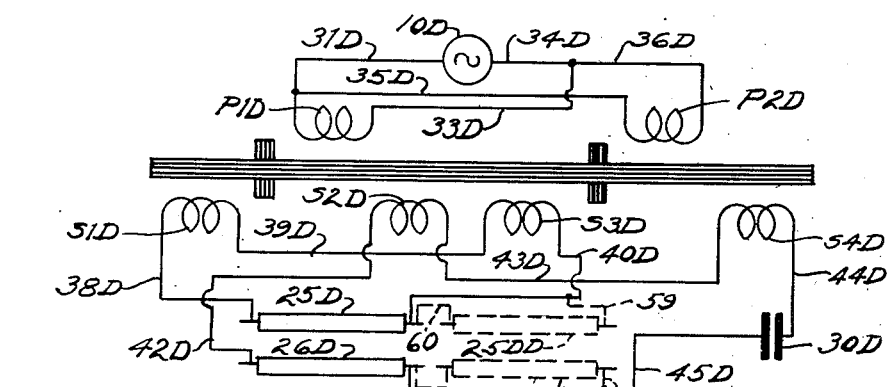
INVENTOR.
Charles R. Kazebee
BY
Bates, Peare & McBean Aug. 11, 1953  C. R. KAZEBEE  2,648,802
SYSTEM AND APPARATUS FOR GASEOUS TUBES
Filed Jan. 10, 1949  3 Sheets-Sheet 3
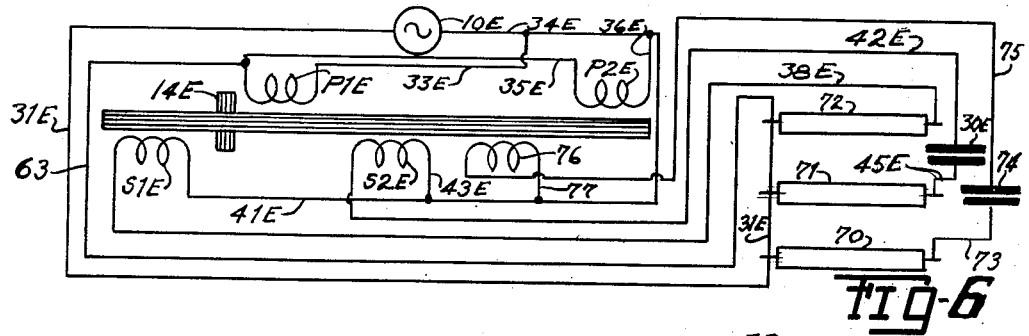
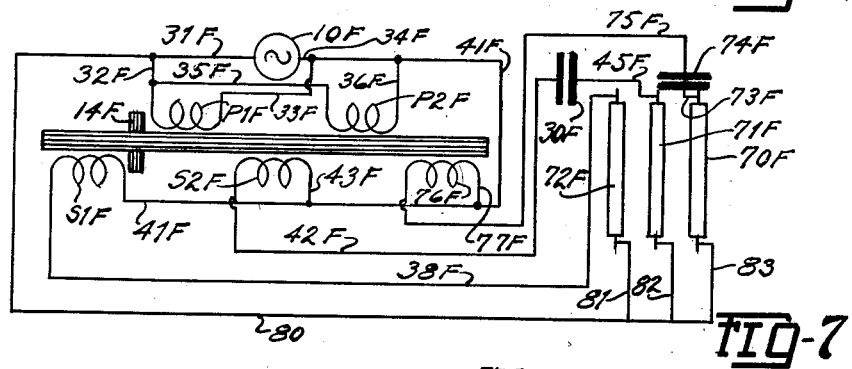
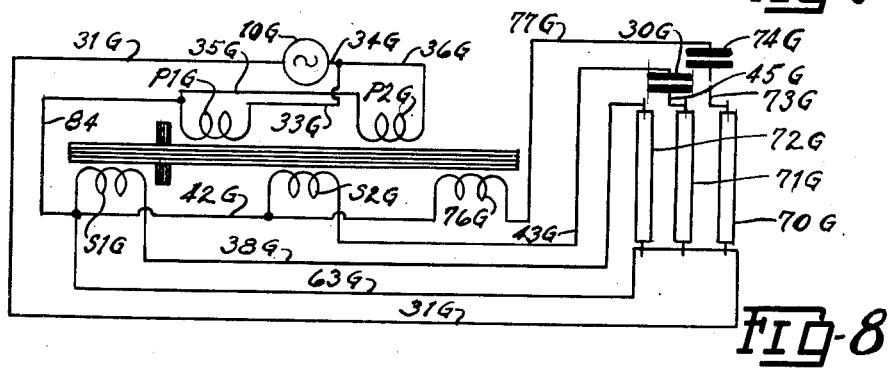
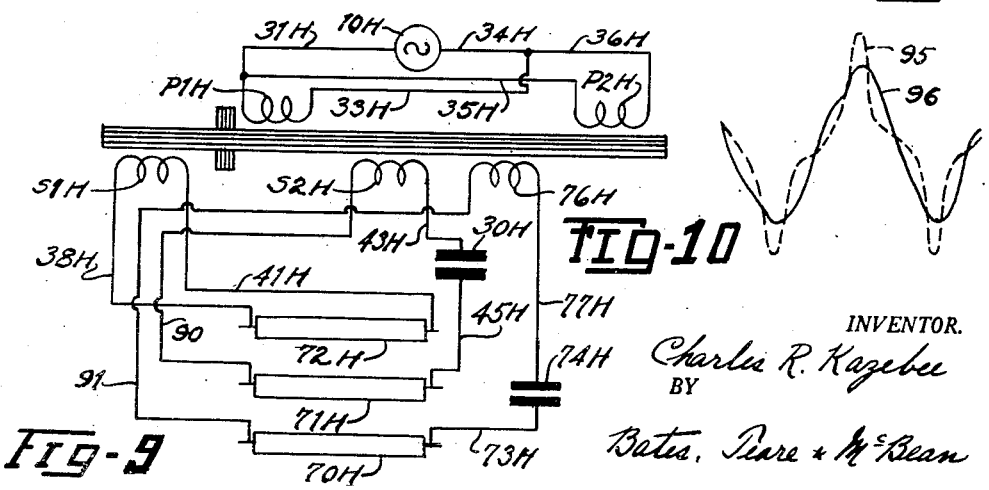
INVENTOR.
Charles R. Kazebee
BY
Bates, Teare & McBean Patented Aug. 11, 1953

2,648,802

UNITED STATES PATENT OFFICE 2,648,802

SYSTEM AND APPARATUS FOR GASEOUS TUBES

Charles R. Kazebee, Cleveland, Ohio, assignor to France Manufacturing Company, Cleveland, Ohio, a corporation of Ohio Application January 10, 1949, Serial No. 70,127

7 Claims. (Cl. 315—138)

This invention relates to electrical apparatus and particularly to a system and apparatus which is used for controlling and operating gaseous tubes, such as fluorescent light sources.

The trend in the construction of power units which are used for the operation of fluorescent tubes has been directed to the design of a long unit of relatively small cross section in order that the unit may fit into the casing which is used by the majority of fixture manufacture. Initially, such casing formation was determined by ballast manufacturers who were using a transformer in combination with two or more inductors, and one or more capacitors which inherently facilitated assembled in a long case of small cross section.

To reduce the amount of equipment utilizable as a ballast, a power unit embodying a three-coil transformer and a condenser has been utilized wherein one of the coils of the transformer has constituted the primary winding and the other two coils have constituted the secondary winding, such as is shown for example in Letters Patent of the United States No. 2,354,879 issued August 1, 1944, to P. K. Ranney. In such patent, a magnetic shunt has been disposed between the primary and one secondary winding so as to produce a lagging current, while the other secondary winding has been closely coupled to the primary winding and has a condenser connected in circuit therewith, so as to produce a leading current. A fluorescent tube has been connected in circuit with each secondary winding, with the result that the stroboscopic effect has been substantially eliminated and the system has been operated at approximately unity power factor.

Due to the space limitations imposed by the fixture casing, the three-coil transformer unit aforesaid has been limited in width to such an extent as to affect the overall efficiency and particularly to produce a harmonic distortion of the lead circuit current. This distortion manifests itself in a severely peaked lead current wave form, and the effect of the distortion on lamp operation tends to produce low lumen output, to increase the stroboscopic effect, and to shorten the lamp life. Moreover, the effects of the distortion on ballast operation are increased ballast watt loss and high line current the latter of which tends to lower the line power factor. In addition, the effect of harmonic distortion tends to increase the ballast operating temperature and in general results in a lowered ballast efficiency.

The aforesaid harmonic distortion in the lead circuit is attributed to the increased leakage reactance component of the total lead circuit inductive reactance. To minimize the harmonic distortion of the lead current, it is important that the proper ratio of capacitive reactance to inductive reactance be maintained in the lead circuit, and it has been found that when the proper values of capacitive and inductive reactance are chosen, the wave form of the lead current approaches that of a sinusoid, and the circuit delivers optimum wattage to the lamp or lamps under conditions of maximum efficiency.

An object of the present invention is to provide a system and apparatus for overcoming the harmonic distortion in the lead circuit, and at the same time to maintain the transformer overall dimensions of such low value as to enable the unit to be readily installed within a standard casing. The object includes a construction which reduces the leakage reactance component of the total lead circuit inductance reactance, so that the unit can be designed for proper ratio of capacitive reactance to inductive reactance while still maintaining the ballast cross section within the available limits of casing design.

I accomplish the aforesaid effect of leakage reactance by sub-dividing each of the primary and secondary windings into two or more individual sections while utilizing the principle of circuit operation set forth in the aforesaid Patent No. 2,354,879, and also retaining the advantages of elimination of cumbersome external reactors. In this way I control the amount of lead circuit inductive reactance by physical location of the primary and secondary windings with respect to each other.

Figure 2:
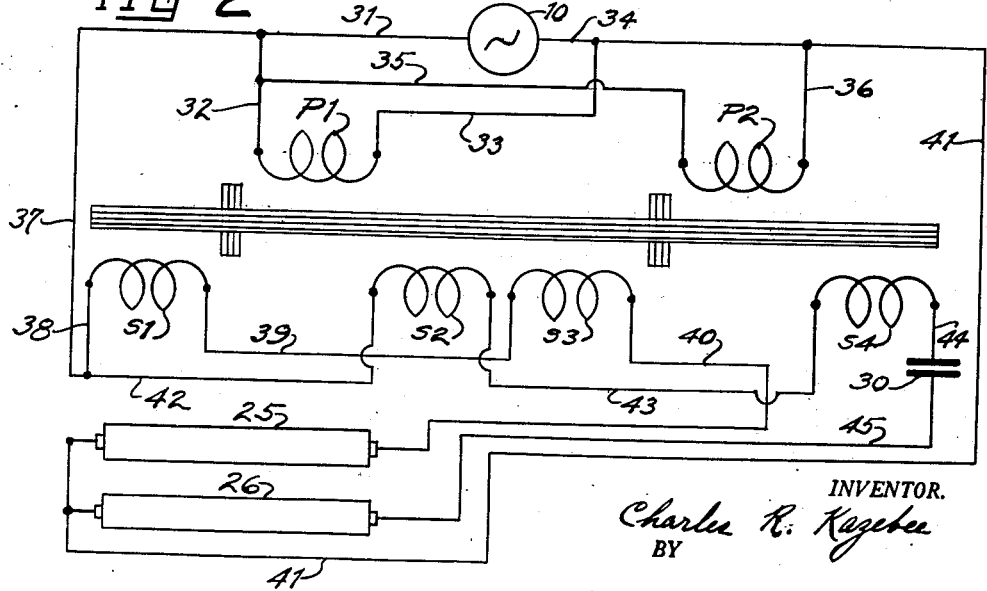

Referring now to the drawings, Fig. 1 shows a power unit embodying the present invention; Fig. 2 is a wiring diagram for the arrangement shown in Fig. 1; Fig. 3 is a wiring diagram of a modified circuit arrangement wherein the transformer is connected as an auto-transformer and wherein the circuit arrangement is such as to interrupt the flow of current in the primary circuit of the transformer whenever a tube is removed from its socket in the fixture; Fig. 4 is a wiring diagram showing a modification similar to Fig. 3 except that the transformer is connected as non-auto; Fig. 5 is a wiring diagram of a modified arrangement wherein the transformer is connected as non-auto and whereing the primary circuit is not broken upon removal of a tube from its socket; Fig. 6 is a wiring diagram showing a modification wherein the unit is connected for operation of three tubes as an auto transformer with provision for interrupting the primary circuit upon removal of a tube; Fig. 7 is a wiring diagram showing a modification for a circuit arrangement embodying three tubes, and wherein the power unit is connected as an auto transformer but with non-primary circuit interruption; Fig. 8 is a wiring diagram showing a modification for use with three tubes wherein the transformer is connected non-auto but the tubes are connected for interruption of the primary circuit upon removal; Fig. 9 is a wiring diagram showing a modification for operating three tubes wherein the transformer is connected non-auto and the tubes are connected for non-primary interruption upon removal, and Fig. 10 are graphs showing the wave form of the lamp current of a three-coil unit, and of a unit embodying the present invention with one graph being superimposed upon the other to show the relationship therebetween.

In Fig. 1, I have shown a source of alternating current supply 10 which is connected to energize primary coils P1 and P2, the connections preferably being such that the coils are connected in parallel. The coils are shown as being mounted upon the central leg 11 of a shell type core, upon which are also mounted secondary coils S1, S2, S3 and S4. Magnetic core shunts in the form of blocks of metallic laminations extend between the central leg and the outer legs 12 and 13 respectively, and are arranged in pairs, one pair being indicated at 14 and 15 as being disposed between the primary coil P1 and the secondary coil S1, while the other pair, indicated at 16 and 17, is positioned between the primary coil P2 and the secondary coil S3. The shunts are such size as to provide suitable air gaps indicated at 18, 19, 20 and 21 respectively.

The load is indicated as a pair of fluorescent tubes 25 and 26 which are arranged to be positioned within a fixture in the usual way. In Fig. 1 the secondary coils are connected in auto transformer relationship with the primary circuit and each tube is connected to two secondary windings in series relationship. Thus, the tube 25 is energized by the secondary windings S1 and S3, while the tube 26 is energized by the secondary windings S2 and S4.

The shunts 14 to 17, inclusive, provide a lagging current for the circuit of the lamp 25, whereas a condenser 30 provides a leading current for the circuit of the lamp 26. The shunts are used for limiting the current in the circuit of the lamp 25 and the condenser is utilized for limiting the current in the lamp 26 to the same value as that of the lamp 25. This arrangement minimizes the stroboscopic effect and produces approximately unity power factor.

Tracing the current flow in Figs. 1 and 2, current from the source 10 flows through conductors 31 and 32 to primary P1 and thence through conductors 33 and 34 back to the source of supply. The primary coil P2 receives current from the source of supply through conductors 31, 32, 35, and the return path to the source constitutes conductors 36 and 34. The connections for the secondary windings and the tube 25 are as follows: From conductor 31 current flows through conductors 37 and 38 to secondary coil S1, thence through conductor 39 to secondary coil S3, thence through conductor 40 to tube 25. The return path is through conductor 41 to conductor 34. The circuit for tube 26 is as follows: From conductor 37 current flows through conductor 42, through secondary coil S2, conductor 43, secondary coil S4, conductor 44, condenser 30, conductor 45, tube 26 and returns through conductor 41. The foregoing description of current flow is for one-half cycle, it being understood that during the other half cycle the directions of current flow are reversed.

While I have shown the system of Fig. 1 as being arranged for operating two tubes, I may, if desired, use four tubes, as indicated by the added tubes which are represented by the broken lines 25A and 26A respectively. In this case, the connections for the primary windings remain the same, but the conductor 40, instead of leading, as shown by the full line, to the tube 25, extends as shown by the broken line 40A to the tube 25A. The tube 25A is connected to the tube 25 by conductor 46. Similarly, for the tube 26A, current from the condenser flows through conductor 45 to conductor 45A through tube 26A, and conductor 47 to the tube 26. From the foregoing description, it will be apparent that where four tubes are used, the tubes are arranged in pairs with the pairs 25 and 25A being connected in series, and the pair 26 and 26A being connected in series.

Fig. 3 illustrates a modification of the invention wherein the transformer is connected as an auto transformer, but wherein the circuit arrangements are such that removal of a tube from its socket interrupts the flow of primary current. The result of such action is to discontinue the flow of flux through the core and thereby to lower the secondary voltage to zero. This avoids the possibility of shock to anyone while a tube is out of its socket.

In the modification of Fig. 3, the current flow for a half cycle is from the source of alternating current supply 10B through conductor 31B, through the sockets for one end of the tubes 26B and 25B, respectively, through primary coil P1B, conductor 33B and conductor 34B back to the source of supply. Primary coil P2B is connected in parallel with the coil P1B hence, current from line 31B also flows through 35B and, after energizing coil P2B returns through conductors 36B and 34B. With such arrangement, removal of either tube interrupts the flow of current in the primary circuit.

Fig. 3 is connected as an auto transformer, hence, current from the line 31B flows through tube 25B, through conductor 38B, secondary coil S1B, line 39B, secondary coil S3B, conductor 41B and back to the line 34B. Similarly, current from the line 31B flows through tube 26B through conductor 45B, condenser 30B, conductor 42B, coil S2B, conductor 43B, coil S4B, conductor 44B, and thence through the common return conductor 41B to line 34B.

The arrangement of Fig. 3 is also suitable for operating four tubes which are arranged in pairs with the tubes of each pair being connected in series. Accordingly, the added tubes are shown in broken lines 25BB and 26BB with a connection between the first pair of tubes being indicated at 50, and a connection between the second pair of tubes being indicated at 51. In this case, the tube 25BB is connected to the conductor 38B by the conductor 52, while the tube 26BB is connected to the conductor 45B and thence to the condenser 30B by the conductor 53.

In the modification of Fig. 4, the connections are such that the transformer is connected non-auto, but the removal of a tube from its socket breaks the primary current. Accordingly, the flow of current for a half-cycle with this modification is as follows: From the source of alternating current supply 10C current flows through the line 31C through the sockets for the tubes 26C and 25C respectively, thence through primary coil P1C, conductor 33C, and back to the source of supply through line 34C. The primary coils are connected in parallel, hence, the current from line 31C through line 35C, coil P2C and conductor 36C and 34C back to the source of supply. The flow of current in the secondaries is as follows: From the primary line 31C, current flows through the line 38C, through coil S1C, line 39C, coil S3C, line 40C through tube 25C and back to the line 31C. Similarly, for the tube 26C, current flows from the line 31C through line 42C, through coil S2C, line 43C, coil S4C, line 44C, condenser 30C, line 45C, through tube 26C and back to the line 31C.

In the event that four tubes are desired for use with the arrangement of Fig. 4, then the tubes may be connected in series in the same manner as that illustrated for Figs. 1 and 3, in which case, current, after flowing through the secondary coils S1C and S3C and line 40C, would flow through line 55, through tube 25CC, through line 56, and tube 25C, whereas, current, after flowing through the secondary coils S2C and S4C and condenser 30, would flow through line 45C, line 57, tube 26CC, line 58 and through tube 26C.

In the modification of Fig. 5, the primary coils are connected in parallel, the transformer is connected non-auto and the removal of a tube from its socket would not break or interrupt the flow of current in the primary circuit. Accordingly, in this arrangement, current for a half cycle flows from the source of alternating current supply 10D through line 31D, coil P1D, line 33D and line 34D back to the source of supply. Similarly, current flows from line 31D, through line 35D, coil P2D, line 36D and 34D back to the source of supply. The flow of current in the tube circuits for a half cycle is as follows: Starting at the left hand socket of tube 25D, current flows through line 38D, coil S1D, line 39D, coil S3D, line 40D, thence to the right hand socket for the tube 25. Similarly, for the tube 26D, current flows from the left hand socket through line 42D, coil S2D, line 43D, coil S4D, line 44D, condenser 30D, line 45D, to the right hand socket of the tube 26D.

In the event that it is desired to use four tubes, in the modification of Fig. 5, then the tubes are arranged in pairs in a manner similar to that described in connection with Fig. 1, and are connected in series, so that for the tubes 25D and 25DD, current, for a half-cycle, after flowing through the coils S1D and S3D, flows through line 40D, thence through line 59, through tube 25DD, line 60, tube 25D and back through line 38D. Similarly, current after flowing through the coils S2D and S4D, and condenser 30, flows through line 45D, line 61, tube 26DD, thence through line 62 to the tube 26D, and back through line 42D.

In the modification of Fig. 6, an arrangement is shown for lighting three tubes with a transformer which is connected as an auto-transformer and also to interrupt the flow of current in the primary circuit upon removal of any tube.

Assuming connections as shown in Fig. 6, then the current flow for a half-cycle is as follows: From the source of supply 10E current flows through line 31E to the left hand socket of the tubes 70, 71 and 72, thence through line 63 through coil P1E, line 33E and line 34E back to the source of supply. From the line 63 current flows through line 35E through coil P2E, line 36E and back through line 34E to the source of supply.

In the secondary circuits of Fig. 6, current for a half-cycle flows from line 31E, through tube 72, line 38E, coil S1E, line 41E, and thence through the line 34E to the other side of the primary circuit. In this modification, only one set of magnetic core shunts is utilized, as is indicated at 14E and 15E, and such shunts are disposed between the primary coil P1E and the secondary coil S1E. This produces a lagging circuit in the current used for energizing the tube 72.

Current for a half-cycle for energizing the tube 71 (Fig. 6) flows from line 31E, through tube 71, through line 45E, condenser 30E, line 42E, coil S2E, thence through line 43E and line 41E back to the other side of the primary circuit. Similarly, the current flow for a half-cycle through tube 70 is from line 31E through tube 70, through line 73, condenser 74, line 75, coil 76, line 77, to line 41E and thence back to the other side of the primary.

In the modification of Fig. 6, it will be observed that the tubes 70 and 71 draw leading current, while the tube 72 draws lagging current. It will also be observed that there are only three secondary coils and that the coils S2E and coil 76 are disposed between the primary coils P1E and P2E. In this modification, the shunts 14E and 15E limit the current to the same value as that limited by the condensers 74 and 30E.

The modification of Fig. 7 is for operating three tubes, wherein the core and coil arrangement is such as to produce an auto transformer, but wherein the removal of a tube from a socket does not interrupt the flow of the current in the primary circuit. The flow of current in this modification for a half cycle is as follows: From the source of current supply 10F, current flows through line 31F, through line 32F, coil P1F, line 33F, and line 34F back to the source of supply. Current also flows from line 32F through line 35F, coil P2F and line 36F back through line 34F to the source of supply.

The current flow for a half-cycle in the respective tubes of Fig. 7 is as follows: From the line 31F current flows through line 80, through line 81, tube 72F, line 38F, coil S1F, line 41F and back to line 34F. Similarly current from line 80 flows through line 82 through tube 71F, line 45F, condenser 30F, line 42F, coil S2F, line 43F, to line 41F and thence back to the other side of the primary. Also for tube 70F, current flows from line 80 through line 83, tube 70F, line 73F, condenser 74F, line 75F, coil 76F, line 77F and line 41F back to the other side of the primary.

The modification of Fig. 8 is similar to that of Figs. 6 and 7 insofar as concerns the core and coil arrangement, but in this case the connections are such that the transformer is connected non-auto, while the tubes are arranged upon removal to interrupt the flow of current in the primary circuit. Thus, for this modification, where three tubes are used and for a half-cycle, current flows from the source of alternating current supply 10G through line 31G, through sockets at one end of the respective tubes 70G, 71G and 72G, thence through line 63G, line 84, coil P1G, line 33G and 34G back to the source of supply. Current also flows from line 84 through line 35G, coil P2G, line 36G and line 34G back to the source of supply. Current for energizing the tube 72G flows for a half-cycle from coil S1G through line 38G, tube 72G and line 63G, back to coil S1G. Current for energizing the tube 71G flows from line 63G through line 42G, coil S2G, line 43G, condenser 30G, line 45G, through tube 71G, and back to line 63G. Current for energizing the tube 70G flows from line 63G to line 42G, through coil 76G, line 77G, condenser 74G, line 73G through tube 70G and back to the line 63G.

In the modification of Fig. 9, the transformer is arranged as non-auto and the tube circuits are so arranged that although three tubes are utilized, the current flow in the primary circuit is not interrupted upon removal of any tube. In this modification the current flow for a half-cycle is from the source of current supply 10H, through line 31H, coil P1H, line 33H, and line 34H back to the source of supply. Similarly, current flows from line 31H through line 35H, coil P2H, and line 36H back to the source of supply.

The current for the secondary circuit of Fig. 9 flows through coil S1H, line 41H, tube 72H, and then back through line 38H to the coil S1H. Current for the tube 71H flows from coil S2H through line 43H, condenser 30H, line 45H, tube 71H, and then back through line 90 to the coil S2H. Similarly, for the tube 70H, current flows from coil 76H, through line 77H, condenser 74H, line 73H, tube 70H and then back through line 91 to the coil 76H.

From the foregoing it will be observed that for the modifications of Figs. 6 to 10, inclusive, only one magnetic core shunt is utilized and is disposed between a primary coil and a secondary coil for imparting a lagging current to the circuit for one of the tubes. It will also be observed that there are two other secondary coils which are disposed on the side of the primary coil P1 opposite to the magnetic shunt and that a condenser is connected in series with each of the last-named secondary coils. The magnetic shunt limits the current in one tube while each of the condensers limits the current in the other tubes, and the values of the shunt and condensers are so chosen that the limit of the current in each of the tubes having the leading current is equal to the current which is limited by the shunt.

An example of a power unit and system assembly as shown in Fig. 1 may be illustrated as using a source of alternating current supply at 118 volts and 60 cycles. The load circuit embodies two gaseous tubes, such as those designated as standard 100 watt fluorescent lamps. The transformer has a core of the shell type with a center leg substantially 1″ x 1″ in cross section. The two primary coils each embody 560 turns of #22 wire and are connected in parallel, and each of the four secondary coils has 600 turns of #22 wire. The condenser has a capacity of 6.5 microfarads and the air gaps of the shunts are so chosen as to result in a limit of the current in the lag circuit to substantially the same value as the current in the lead circuit. With this assembly, the power factor will be approximately 95%. In addition to the foregoing equalization of current in the respective tube circuits, the relationship between the air gaps of the shunts and the capacity of the condenser are so related as to provide equal brightness in the two tubes.

In Fig. 10, I have shown a graph illustrating the two wave forms, one in broken lines designated 95 representing the lead circuit current obtained with the prior aforesaid construction of transformer, and the other in a solid line indicated at 96 representing the lead circuit current obtained with the transformer embodying the present invention. It will be observed that the wave form of the present invention is more nearly sinusoidal and is free from the peaks which are characteristic of the former construction.

An advantage of the present invention is the fact that I have overcome the harmonic distortion in the lead circuit and at the same time I have maintained the transformer overall dimensions to such low value as to enable the unit to be readily installed within a standard casing.

I claim:

1. An apparatus adapted for operating a plurality of discharge tube loads comprising in combination, a closed magnetic core having an inner and two outer legs, a first, second, third, and fourth secondary coil mounted respectively in axial spaced relation from each other on said inner core leg, means connecting one end of said first secondary coil to one end of said third secondary coil and other means connecting one end of said second secondary coil to one end of said fourth secondary coil to form a first and second secondary winding respectively, a primary winding subdivided into a pair of spaced primary coils, a first one of said primary coils mounted on said inner core leg intermediate said first and second secondary coils and closely coupled to said second secondary coil, said second primary coil mounted on said inner core leg intermediate said third and fourth secondary coils and closely coupled to said fourth secondary coil, magnetic core shunts positioned between said inner and outer core legs intermediate said first primary and secondary coils and intermediate said second primary coil and said third secondary coil respectively, and a condenser connected in series with one end of said closely coupled second secondary winding.

2. The apparatus of claim 1 including a source of alternating current electrical energy, means connecting each of said primary coils across said source of energy, means connecting one end of each of said secondary windings to one electrical side of said source of energy, a discharge tube load having one terminal connected in series with said condenser to the other end of said closely coupled second secondary winding, another discharge tube load having one terminal connected to the other end of said first secondary winding, and means connecting the other terminal of each of said tube loads to the other electrical side of said source of energy.

3. The apparatus of claim 1 including a source of alternating current electrical energy, means connecting one end of each of said primary coils to one electrical side of said source of energy, means connecting one end of each of said secondary windings to said one electrical side of said source of energy, a plurality of discharge tube loads having electrical terminals at each end including sockets for detachably receiving each tube, each socket having normally open contacts adapted to be closed by the respective tube load terminals, one of said tube loads connected at one terminal to the other end of said closely coupled second secondary winding through said condenser, another of said tube loads connected at one terminal to the other end of said first secondary winding, and means connecting the other end of each of said primary coils to the other electrical side of said source of energy through the normally open socket contacts at the other terminal of each of said tube loads.

4. An apparatus for operating a plurality of discharge tube loads from a source of alternating current energy comprising, a closed magnetic core having parallel inner and outer legs separated from each other throughout their length and interconnected at their ends to form a closed magnetic path, a primary winding on said core, said primary winding being subdivided into a first and a second independent primary coil, each mounted in physical axial spaced relation on said inner core leg, at least four independent secondary coils axially spaced along said inner core leg, a first secondary coil mounted at one end of said inner core leg in physical axial spaced relation from one side of said first primary coil, a magnetic core shunt positioned between the inner and outer core legs respectively intermediate said first primary and first secondary coils, a second secondary coil located intermediate said first and second primary coils and closely coupled on the other side of said first primary coil from said first secondary coil, a third secondary coil located intermediate said second secondary coil and said second primary coil, a second magnetic core shunt positioned between the inner and outer core legs intermediate said second primary and third secondary coils, the fourth secondary coil located in closely coupled relation adjacent the other side of the second primary coil from the third secondary coil, means connecting one end of the fourth secondary coil to one end of said second secondary coil and other means connecting one end of said first secondary coil to one end of said third secondary coil to form a pair of subdivided secondary windings, and a condenser connected in series with the other end of one of said closely coupled secondary coils.

5. The apparatus of claim 4 including a source of alternating current electrical energy, means connecting one end of each of the primary coils to said source, a plurality of discharge tube loads having electrical terminals at each end and including sockets for detachably receiving each tube, each socket having normally open contacts adapted to be closed by the respective tube load terminals, one of said tube loads connected at one terminal in series with the closely coupled secondary winding through the condenser, another of said tube loads connected at one terminal in series with the other secondary winding, means interconnecting the other ends of each of the secondary windings, and other means connecting the other end of each of said primary coils to the other electrical side of said source through the interconnected ends of the secondary windings and the normally open socket contacts at the other terminal of each of said tube loads respectively.

6. An apparatus adapted for operating a plurality of discharge tube loads comprising in combination, a closed magnetic core having an inner and two outer legs, a first, second, third, and fourth secondary coil mounted respectively in axial spaced relation from each other on said inner core leg, a primary winding subdivided into a pair of spaced primary coils, a first one of said primary coils mounted on said inner core leg intermediate said first and second secondary coils and closely coupled to said second secondary coil, said second one of said primary coils mounted on said inner core leg intermediate said third and fourth secondary coils and closely coupled to said fourth secondary coil, magnetic core shunts positioned between said inner and outer core legs intermediate said first primary and secondary coils and intermediate said second primary coil and said third secondary coil respectively, and a condenser connected in series with one end of at least one of said closely coupled secondary coils.

7. The apparatus of claim 4 including a source of alternating current energy, means connecting each of said primary coils across said source, a plurality of discharge tube loads, means connecting one of said tube loads across the closely coupled secondary winding in series with the condenser, and other means connecting another of said tube loads across the other secondary winding.

CHARLES R. KAZEBEE.

References Cited in the file of this patent

UNITED STATES PATENTS

| Number | Name | Date |
|---|---|---|
| 2,025,471 | Osborne | Dec. 24, 1935 |
| 2,241,261 | Horn | May 6, 1941 |
| 2,269,978 | Kronmiller | Jan. 13, 1942 |
| 2,289,175 | Boucher | July 7, 1942 |
| 2,295,757 | Russell | Sept. 15, 1942 |
| 2,305,487 | Naster | Dec. 15, 1942 |
| 2,352,073 | Boucher and Kuhl | June 20, 1944 |
| 2,355,360 | Boucher and Noble | Aug. 8, 1944 |
| 2,401,555 | De Reamer | June 4, 1946 |
| 2,465,031 | Nathanson | Mar. 22, 1949 |
| 2,472,140 | Berger | June 7, 1949 |
| 2,496,981 | Boucher and Keiser | Feb. 7, 1950 |